United States Patent
Gassmann

(10) Patent No.: US 10,508,737 B2
(45) Date of Patent: Dec. 17, 2019

(54) MULTI-STEP TRANSMISSION AND CONTROL THEREOF

(71) Applicant: GKN Automotive Ltd., Redditch, Worcestershire (GB)

(72) Inventor: Theodor Gassmann, Siegburg (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 0 days.

(21) Appl. No.: 16/078,035

(22) PCT Filed: Feb. 29, 2016

(86) PCT No.: PCT/EP2016/054225
§ 371 (c)(1),
(2) Date: Aug. 21, 2018

(87) PCT Pub. No.: WO2017/148501
PCT Pub. Date: Sep. 8, 2017

(65) Prior Publication Data
US 2019/0085976 A1 Mar. 21, 2019

(51) Int. Cl.
*F16H 63/28* (2006.01)
*F16H 63/30* (2006.01)

(52) U.S. Cl.
CPC .......... *F16H 63/28* (2013.01); *F16H 63/304* (2013.01); *F16H 2063/305* (2013.01); *F16H 2200/0034* (2013.01)

(58) Field of Classification Search
CPC .. F16H 63/28; F16H 63/304; F16H 2063/305; F16H 2200/0034; F16D 23/12; F16D 21/06
(Continued)

(56) References Cited

U.S. PATENT DOCUMENTS

| 6,880,422 B2 * | 4/2005 | Yamamoto | F16H 61/32 74/471 XY |
| 10,274,023 B2 * | 4/2019 | Park | F16D 23/12 |

(Continued)

FOREIGN PATENT DOCUMENTS

| DE | 199 17 673 A1 | 10/2000 |
| DE | 10 2005 022 926 B3 | 2/2007 |

(Continued)

OTHER PUBLICATIONS

International Search Report and Written Opinion for PCT/EP2016/054225 dated Aug. 12, 2016 (11 pages with English translation).

*Primary Examiner* — Victor L MacArthur
(74) *Attorney, Agent, or Firm* — Bejin Bieneman PLC

(57) ABSTRACT

A multi-step transmission for a motor vehicle comprises an input shaft, an output shaft, a first transmission stage and a second transmission stage, a clutch which can be transferred into three clutch positions to drivingly connect the input shaft and the output shaft with each other or disconnect them from each other; and an actuating assembly with a setting element that is movable in three setting positions and is connected to a movable clutch part of the clutch, wherein the actuating assembly comprises first and second electromagnetically operable actuators which can be operated independently from one another and which jointly act on the setting element such that the setting element can be transferred by the first and the second actuator into the three setting positions. An electric drive can have such a multi-step transmission.

16 Claims, 8 Drawing Sheets

(58) Field of Classification Search
USPC .............. 74/473.1, 473.12, 473.36, 473.37
See application file for complete search history.

(56) References Cited

U.S. PATENT DOCUMENTS

2011/0113913 A1   5/2011  Zheng et al.
2017/0159722 A1*  6/2017  Park ..................... F16D 23/12

FOREIGN PATENT DOCUMENTS

| EP | 1 271 012 A2 | 1/2003 |
| EP | 1 464 877 A2 | 10/2004 |
| WO | 2012007030 A1 | 1/2012 |
| WO | 2012007031 A1 | 1/2012 |
| WO | 2014005698 A1 | 1/2014 |
| WO | 2015149875 A1 | 10/2015 |

* cited by examiner

| 12 | A1 | A1 | A2 | A2 |
| --- | --- | --- | --- | --- |
| 12' | A1 | A2 | A1 | A2 |
| 9 | S1 | S2 | S2 | S3 |
| 7 | C1 | C0 | C0 | C2 |

| 12 | A1 | A2 | A1 | A2 |
| --- | --- | --- | --- | --- |
| 12' | A1 | A2 | A2 | A1 |
| 9 | S2 | S2 | S1 | S3 |
| 7 | C0 | C0 | C1 | C2 |

| 12 | A1 | A2 | A1 | A2 |
|---|---|---|---|---|
| 12' | A1 | A1 | A2 | A2 |
| 9 | S1 | S2 | S2 | S3 |
| 7 | C1 | C0 | C0 | C2 |

MULTI-STEP TRANSMISSION AND CONTROL THEREOF

CROSS-REFERENCE TO RELATED APPLICATIONS

This application is a national stage of, and claims priority to, Patent Cooperation Treaty Application No. PCT/EP2016/054225, filed on Feb. 29, 2016, which application is hereby incorporated herein by reference in its entirety.

BACKGROUND

Multi-step transmissions are used for example in electric drives for driving an electrically driven axle of a motor vehicle in different speed ranges. A multi-step transmission normally comprises a rotatingly drivable input shaft, an output shaft and at least one first transmission stage as well as a second transmission stage. By configuring torque transmitting members of the first and the second transmission stage, torque can be transmitted to the output shaft at different transmission ratios. The electric drive can serve as a single drive for the motor vehicle or it is possible, additionally, to provide an internal combustion engine. In this case, the electric drive and the internal combustion engine can either drive the motor vehicle individually or jointly superimposed.

An electric drive commonly comprises an electric machine as well as a downstream reduction gearing which translates a high speed into a low speed. The reduction gearing can be switchable and is then also referred to as a multi-step transmission. From the reduction gearing the torque is transmitted to the driveline of a motor vehicle, for example to a differential gearing arranged in the torque flow downstream from the reduction gearing. A differential gearing can distribute an introduced torque to two output shafts which have an equalizing effect relative to one another.

From DE 10 2005 022 926 B3 a drive unit for a motor vehicle is known, having an electric motor, a change-speed gearing with at least two gear stages and a differential. The motor drives the differential via an intermediate shaft. For operating the two transmission stages there is provided an actuator assembly which comprises a rotatingly drivable switching roller. The switching roller is used to operate a switching muff which operates two clutches.

WO 2015/149875 A1 proposes an actuator assembly for a clutch in a multi-step transmission. The actuator assembly comprises an electrically driven ball spindle drive. The ball spindle drive can be used, optionally, to transfer the clutch into three transmission positions: a first transmission stage, a second transmission stage and a neutral position.

WO 2012/007031 A1 proposes an electric drive for a motor vehicle, having an electric motor and a transmission unit. The transmission unit comprises, in a series-connected way, a first transmission stage in the form of a spur gear or chain drive, a second transmission stage in the form of a planetary gearing and a differential gearing. By means of a clutch, the sun gear of the planetary gearing can optionally be connected to the hollow gear in a rotationally fixed way or it can be rotationally fixedly supported on a stationary housing part or it can be changed into an idling condition.

From WO 2012/007030 A1 there is known an electric drive for a motor vehicle, having an electric motor and a transmission unit. The transmission unit comprises a planetary gearing and a differential gearing which are arranged coaxially relative to one another. There is provided a clutch which can be transferred into three transmission positions, i.e., two different transmission stages as well as an idling condition.

Electric drives having multi-step transmissions require considerable structural measures for the clutches and the actuator assembly. In addition, strict requirements have to be met by the multi-step transmission and/or the actuator assembly in the case of functional failure occurring under unforeseeable conditions, so-called Fail-Safe functions.

DESCRIPTION

The present disclosure relates to a multi-step transmission with an actuator assembly for a motor vehicle driveline and to an electric drive with such a multi-step transmission. The actuator assembly is configured to be simple and cost-effective, which permits reliable gear-changing and/or which, even in cases of unwanted functional failure, ensures a safe gear-changing behaviour. Furthermore, an electric drive comprising such a multi-step transmission is constructed in a simple way and comprises robust transmission functions.

A multi-step transmission, in particular for use in a driveline of a motor vehicle, comprises: an input shaft, an output shaft rotatingly drivable by the input shaft; a first transmission stage; a second transmission stage; a clutch which can be transferred into three clutch positions and which is configured to selectively drivingly connect the input shaft and the output shaft to each other via the first transmission stage or the second transmission stage, or to disconnect the input shaft and the output shaft from each other; an actuating assembly for operating the clutch, wherein the actuating assembly comprises a movable setting element which can be moved into three setting positions and which is connected to a movable clutch part of the clutch; wherein the actuating assembly comprises a first electromagnetically operable actuator and a second electromagnetically operable actuator which can be operated independently of each other and which jointly act on the setting element such that the setting element can be transferred by the first and the second actuator selectively into one of the three setting positions.

An advantage is that, because of the electromagnetic actuators, the multi-step transmission comprises a simple technical configuration. By using two actuators it is possible to reliably achieve three gear-changing positions of the multi-step transmission, and even in the case of an undesirable functional failure such as power failure, the safety and functional ability of the driveline are ensured. In this way it is possible to eliminate complicated structural elements for a fail-safe function.

In an embodiment, the electromagnetically operated actuators are configured such that they are able to assume exactly two actuating positions, i.e., a first actuating position and a second actuating position. This simple configuration of the actuators does not require intermediate positions between the first and the second actuating position. The two positions, for example, can be a moved-out position and a moved-in position of an adjustable actuator part, for instance of a movable piston.

The connection between the setting element and the movable clutch part can comprise any suitable technical coupling and/or transmission of the setting position of the setting element to the movable clutch part. The connection can be effected directly or also indirectly via intermediate transmission members. According to a possible embodiment, a transmitting member is provided between the setting element and the movable clutch part, which transmits a movement of the setting element to the movable clutch part.

According to an embodiment, the setting element can comprise a first portion which is effectively connected to the first actuator and a second portion which is effectively connected to the second actuator. The first portion and the second portion are spaced from each other, wherein a first line of force of the first actuator and a second line of force of the second actuator extend through the associated first and respective second portion. In this way, the first actuator and the second actuator act on different portions of the setting element, so that by operating the first actuator, the setting element is moved in a different way than by operating the second operator. By superimposing the movement components of the first and second actuator on one another, the setting element can be transferred into three different setting positions. According to one possible embodiment, the first line of force and the second line of force can be arranged in parallel and/or at a distance relative to each other.

The setting element can be configured in particular as a pivotable rocker which is pivotable around a pivot axis. The pivot axis can be arranged between the first portion and the second portion, i.e., the lines of force of the two actuators are positioned on different sides of the pivot axis and at a distance therefrom. In an embodiment, the movable clutch part is effectively connected to the setting element in the region of the pivot axis. This configuration and/or arrangement allow different kinematic movements of the setting element to be effected which can be adapted to the specific technical requirements.

According to an embodiment, the first and the second actuator each comprise an electromagnet and a piston, with the piston being displaceable when the electromagnet is operated. For example, the actuators can be controlled by an electronic control unit (ECU) which serves to control the driving dynamics of the motor vehicle. The actuators transfer electric signals of the control unit into a mechanical movement of a movable actuator part. It is thus possible to set the transmission position of the multi-step transmission as desired or required for the driving dynamics of the motor vehicle.

The clutch can be transferred by the actuator assembly selectively into a first coupling position in which torque is transmitted via the first transmission stage from the input shaft to the output shaft, and furthermore into a neutral position in which the input shaft and the output shaft are freely rotatable relative to one another, as well as into a second coupling position in which torque is transmitted via the second transmission stage from the input shaft to the output shaft.

According to a first embodiment, at least one of the first and the second actuator can be configured in the form of a mono-stable actuator. In the context of the present disclosure, this refers in particular to an actuator whose piston is force-loaded in a first direction when the electromagnet is supplied with current and which is power-free in the current-less condition of the electromagnet. According to an embodiment it is possible to provide a spring which loads the piston in an opposite second direction, so that in the current-less condition of the electromagnet the piston again assumes the initial position.

According to a first possibility, the first and the second actuator can be arranged such that the two pistons—when the associated electromagnet is subjected to current—are loaded in the same direction. In this case it is proposed that the first and the second actuator can be transferred into a first actuating position and in a deviating second actuating position. By this arrangement, in a specific embodiment, for instance the following transmission stages of the setting element can be effected: a first setting position of the setting element can be set in that the first actuator and the second actuator are each in the first actuating position; a second setting position of the setting element can be set in that one of the first and second actuator is in the first actuating position and the other one of the first and second actuator is in the second actuating position; and a third setting position of the setting element can be set in that the first actuator and the second actuator are each in the second actuating position. The first and the second actuating position can be for example a moved-in position and a moved-out position (or vice versa) of the respective actuator piston.

In the case of connecting the setting element to the clutch such that the second transmission position corresponds to the idling position of the clutch, an undesirable fail-safe function of the two actuators would cause the setting element to be moved automatically into the second transmission stage, with the clutch being opened accordingly.

According to a second possibility, the first and the second actuator can be arranged such that the two pistons—when the respective electromagnet is subjected to current—are loaded in opposite directions. With this arrangement, in a specific embodiment for instance the following transmission stages of the setting element can be effected: a first setting position of the setting element can be set in that one of the first and the second actuators is in the first actuating position and the other one of the first and second actuator is in the second actuating position; a neutral setting position of the setting element can be set in that the first actuator and the second actuator are both in the first actuating position or in the second actuating position; and a second setting position of the setting element can be set in that one of the first and of the second actuators is in the second actuating position and the other one of the first and second actuator in the first actuating position.

If the connection between the setting element and the clutch is such that the second transmission position corresponds to clutch idling, any undesirable failure function of the two actuators for instance in the case of power loss would cause the setting element automatically to be moved into the second transmission position, with the clutch being opened accordingly.

According to a second embodiment, at least one of the first and the second actuator can be configured in the form of a bi-stable actuator. In the context of the present disclosure this refers in particular to an actuator whose piston—if the electromagnet is provided with current with a first polarity—is transferred into a first actuating position and—and if the electromagnet is supplied with current with a second polarity—the piston is transferred into a second actuating position. If the electromagnet is disconnected from current, the piston remains in the existing first and, respectively, second actuating position. A bi-stable actuator thus does not require a returning spring.

It is to be understood that, according to a third embodiment, a combination of the first and second embodiment is possible in that one of the two actuators is configured as a mono-stable actuator and the other one as a bi-stable actuator.

Further disclosed is an electric drive assembly for a motor vehicle, comprising an electric machine for driving the motor vehicle, a multi-step transmission which is drivable by the electric machine and which is configured according to any one of the above embodiments, and a differential gearing which is drivable by the multi-step transmission, wherein the input shaft of the multi-step transmission is drivingly connected to the electric machine, and the output shaft of the multi-step transmission is drivingly connected to the differential gearing.

The electric machine of the electric drive converts energy and can operate as a motor or generator. When operating as a motor, the electric machine converts electric energy into mechanical energy so that a driveline of the motor vehicle can be driven. When the motor operates as a generator, the electric machine converts mechanical energy into electric energy which can then be stored in a battery. This process in the course of which brake energy of the motor vehicle is recovered is also referred to as recuperation.

A method of controlling the multi-step transmission can be characterised in that the first actuator can be transferred into exactly two positions, i.e., into a first actuating position and into a second actuating position, and that the second actuator can be transferred into exactly two positions, i.e., a first actuating position and into a second actuating position. By providing actuators which can be exactly set to two positions, the setting element can technically be transferred into three setting positions.

For example according to a first method embodiment it is possible that the setting element is transferred into a first setting position in that the first actuator and the second actuator are each set to the first actuating position; the setting element is transferred into a neutral setting position in that one of the first and second actuator is set into the first actuating position and the other one of the first and the second actuator is set to the second actuating position; and the setting element is transferred into a second position in that the first actuator and the second actuator are each set to the respective second actuating position.

According to an alternative second method embodiment it is possible that the setting element is transferred into a first setting position in that one of the first and the second actuator is set to the first actuating position and the other one of the first and the second actuator is set to the second actuating position; the setting element is transferred into a neutral position in that the first actuator and the second actuator are both set to the first actuating position or to the second actuating position; and that the setting element is transferred into a second setting position in that the one of the first and second actuator is set to the second actuating position and the other one of the first and the second actuator is set to the first actuating position.

It is to be understood that further method embodiments are possible which can be configured according to the respective technical requirements to be met by the multi-step transmission, in particular by the behaviour in the case of undesirable failure functions.

Preferred embodiments will be described below with reference to the drawings wherein FIG. 1 shows an exemplary multi-step transmission in a first embodiment;

Figures 1, 2:
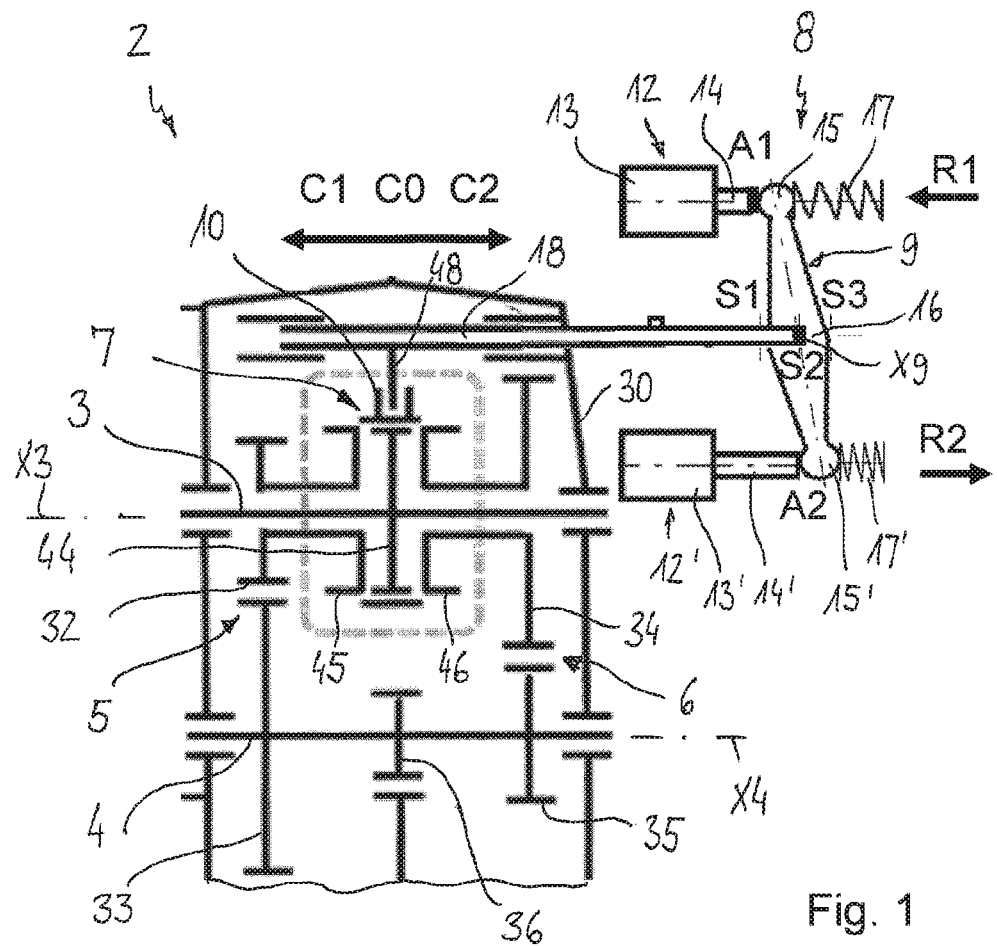
FIG. 2 shows a possible transmission diagram of the multi-step transmission according to FIG. 1.

FIGS. 1 to 4 which will be described jointly below show an exemplary multi-step transmission 2 in a first embodiment. The multi-step transmission 2 comprises ain input shaft 3, a first transmission stage 5, a second transmission stage 5, an output shaft 4, a clutch 7 and an actuating assembly 8. The two transmission stages 5, 6 make it possible that torque introduced into the multi-step transmission can be transmitted from the input shaft 3 to the output shaft 4 at two different transmission ratios i1, i2. The two transmission stages 5, 6 each comprise a plurality of torque transmitting members.

The input shaft 3 can be rotatingly driven by a driving source so that torque can be introduced into the multi-step transmission 2. The driving source can be provided in the form of an electric machine for example. The torque introduced into the multi-step transmission 2 can be transmitted by a clutch 7 selectively via the first transmission stage 5 or the second transmission stage 6 to the output shaft 4. For this, the clutch 7 is configured such that, depending on the clutch position, it can drivingly connect a member of the first transmission stage or a member of the second transmission stage 6 to the input shaft 3 or release same therefrom.

The actuating assembly 8 which, as a functional assembly, can also be referred to as an actuator unit, serves for operating the clutch 7. The actuating assembly 8 can be controllable for example by an electronic control unit (not shown) which serves to control the driving dynamics of the motor vehicle. The actuating assembly 8 comprises a movable setting element 9 as well a first electromagnetic operable actuator 12 and a second electromagnetically operable actuator 12'. The setting element 9 is kinematically effectively connected to the actuators 12, 12' and can be moved by same into three setting positions S1, S2, S3. Furthermore, the setting element 9 is connected to a movable clutch part 10 of the clutch 7 which, accordingly, can be transferred into three clutch positions C1, C0, C2. The two actuators 12, 12' are controllable independently from each other and, accordingly, act independently of each other on the setting element 9. Depending on the individual position of the two actuators 12, 12', the setting element 9 can be transferred selectively into the first, second or third setting position S1, S2, S3, so that the multi-step transmission 2 can be selectively switched into the first gear, into a neutral position or into the second gear.

The two electromagnetic actuators 12, 12' can be configured such that each of the two can assume exactly two actuating positions A1, A2. In this context "actuating positions" means different positions that a movable actuator part can assume when the actuator is operated. Specifically, the two actuators 12, 12' can each comprise an electromagnet 13, 13' and a piston 14, 14'. When the electromagnet 13, 13' is subjected to current, the associated piston 14, 14' is moved from a first position A1 into a second position A2, i.e. the two positions A1, A2 are taken up by switching on and switching off respectively the respective actuator. At the same time, the two electromagnets 13, 13' achieve an additional redundancy for avoiding undesirable transmissions in the case of an unpredictable failure functioning of the system.

The setting element 9 is configured in the form of a pivotable rocker which is pivotable around a pivot axis X9. On opposite sides of the pivot axis X9, the setting element 9 comprises a first portion 15 which is acted upon by the first electromagnetically operable actuator 12, and a second portion 15 which is acted upon by the second electromagnetically operable actuator 12'. The two portions 15, 15' are arranged so as to be spaced from one another, so that first forces introduced by the first actuator 12 to the first portion 15, and second forces introduced by the second actuator 12' to the second portion 15', result in different movements of the setting element 9. At a setting portion 16 positioned between the two end-sided actuator portions 15, 15', a transmitting element 18 is attached which transfers the movement of the setting element 9 to the movable clutch part 10. The setting portion 16 can be positioned centrally, approximately in the region of the pivot axis X9 of the setting element 9 and, to that extent, can also be referred to as a central portion.

By superimposing the movement components of the first and the second actuator 12, 12', which each can be transferred into exactly two positions, the setting element 9 can be moved in three different setting positions S1, S2, S3 which can also be referred to as switching positions. In the present embodiment, the force acting lines of the two actuators 12, 12' extend substantially parallel relative to one another, wherein it is understood that an angular arrangement is also technically possible.

In the present embodiment, the two actuators 12, 12' are configured in the form of mono-stable actuators. The piston 14, 14' of the actuator is force-loaded when the associated electromagnet 13, 13' is subjected to current and is force-free in the current-less condition of the electromagnet. In the present embodiment, the arrangement is such that, when the actuators' 12, 12' are subjected to current, they load the setting element 9 in direction R1 towards the transmission. Per actuator 12, 12' there is provided a spring 17, 17' which acts on the associated piston 14, 14' in a direction R2 which is opposite to the force of the electromagnet, i.e., away from the transmission in the present embodiment. Thus, when the electromagnet is switched off, the piston 14, 14' is loaded by the spring 17, 17' back into its initial position. It is understood that the acting direction of the actuators 12, 12' and of the springs 17, 17' can also be reversed.

By specific reference to FIGS. 2 and 3, a possible transmission arrangement and movement kinematics of the multi-step transmission is described herewith. By subjecting the associated electromagnets 13, 13' to current, the first and the second actuators 12, 12' can be transferred into a first actuating position A1 and a deviating second actuating position A2. Specifically, in the present embodiment, the first and the second actuator 12, 12' are arranged such that the two pistons 14, 14'—when subjecting the associated electromagnets 13, 13' with current—are loaded in the same direction R1.

Figure 3A:
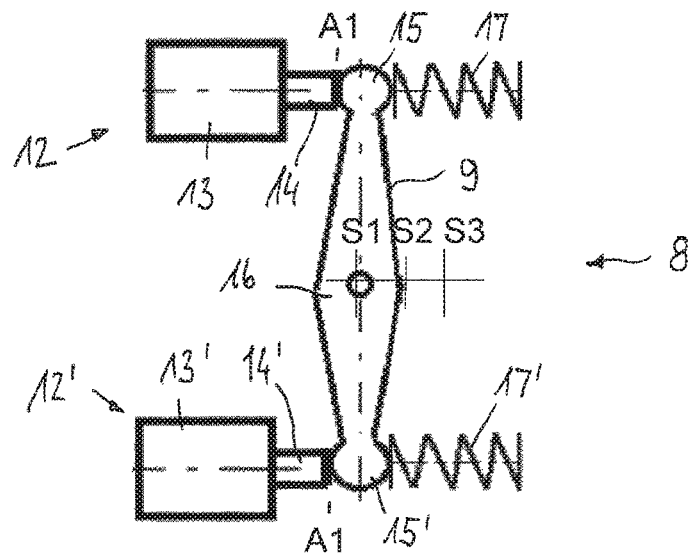
FIG. 3A shows the actuator assembly of the multi-step transmission according to FIG. 1 in a first transmission position.

In the present embodiment, a first setting position of the setting element 9 can be set in that the first actuator 12 and the second actuator 12' are each in the first actuating position A1, as shown in FIG. 3A. The central portion 16 of the setting element 9 is located in an end position (lefthand position in FIG. 3A), so that, accordingly, the transmitting element 18 connected thereto assumes a corresponding end position. The movable clutch member 10 is displaced into the first clutch position C1, so that torque is transmitted from the input shaft 3 to the output shaft 4 via the first transmission stage 5.

Figure 3B:
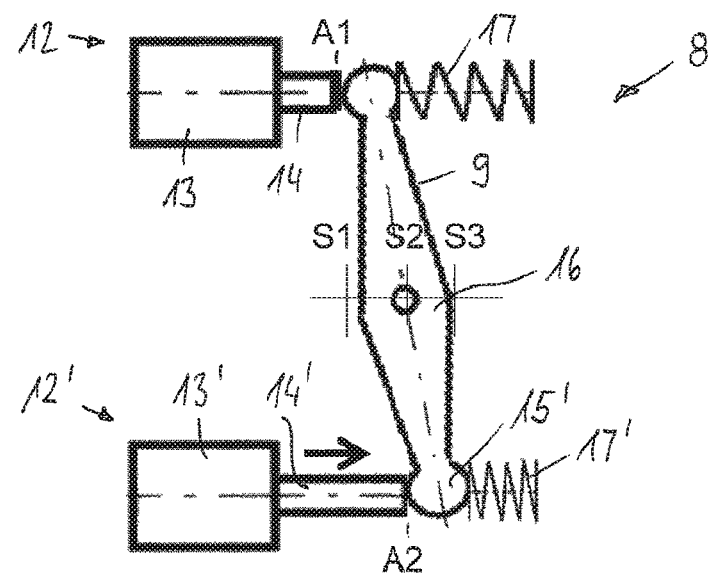
FIG. 3B shows the actuator assembly of the multi-step transmission according to FIG. 1 in a second transmission position.

When operating the actuators 12, 12' such that one is in the first actuating position A1 and the other one in the second actuating position A2, the setting element 9 is moved into a second transmitting position S2 which is shown in FIGS. 1 and 3B. The transmitting element 18 connected to the setting element 9, together with the setting portion 16, is moved out of the end position into a central position. Accordingly, the clutch member 10 connected to the transmitting member 18 is transferred into the neutral clutch position C0, so that the input shaft 3 and the output shaft 4 are disconnected from one another and are able to rotate relative to one another freely.

Figure 3C:
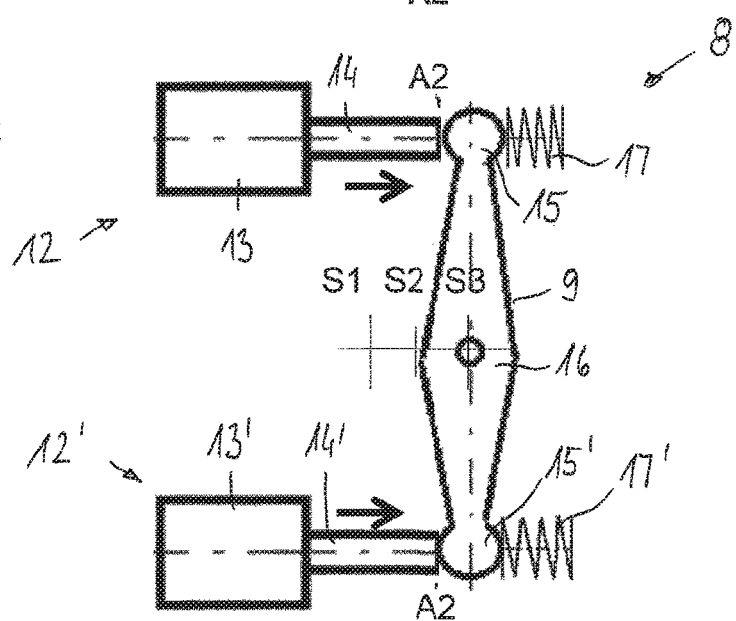
FIG. 3C shows the actuator assembly of the multi-step transmission according to FIG. 1 in a third transmission position.

A third setting position S3 of the setting element 9 can be set in that the first actuator 12 and the second actuator 12' are both in the second actuating position A3. This position is shown in FIG. 3C. The central portion 16 of the setting element 9 is in a second end position (righthand position in FIG. 3C), so that the transmitting member 18 connected thereto also assumes a corresponding end position. The movable clutch member 10 is displaced into the second clutch position C2, so that torque is transmitted from the input shaft 3 to the output shaft 4 via the second transmission stage 6.

An advantage of the actuating assembly 8 with the movable setting element 9 and two actuators 12, 12' acting thereon is that diverse kinematic movements can be effected and, respectively, transmission processes of the setting element which can be flexibly adapted to the specific technical requirements.

Thus it is possible to provide individual solutions regarding the safety functions of the actuator assembly and of the driveline such as they are needed in the case of power failure or unpredictable technical failure situations.

Figure 4:
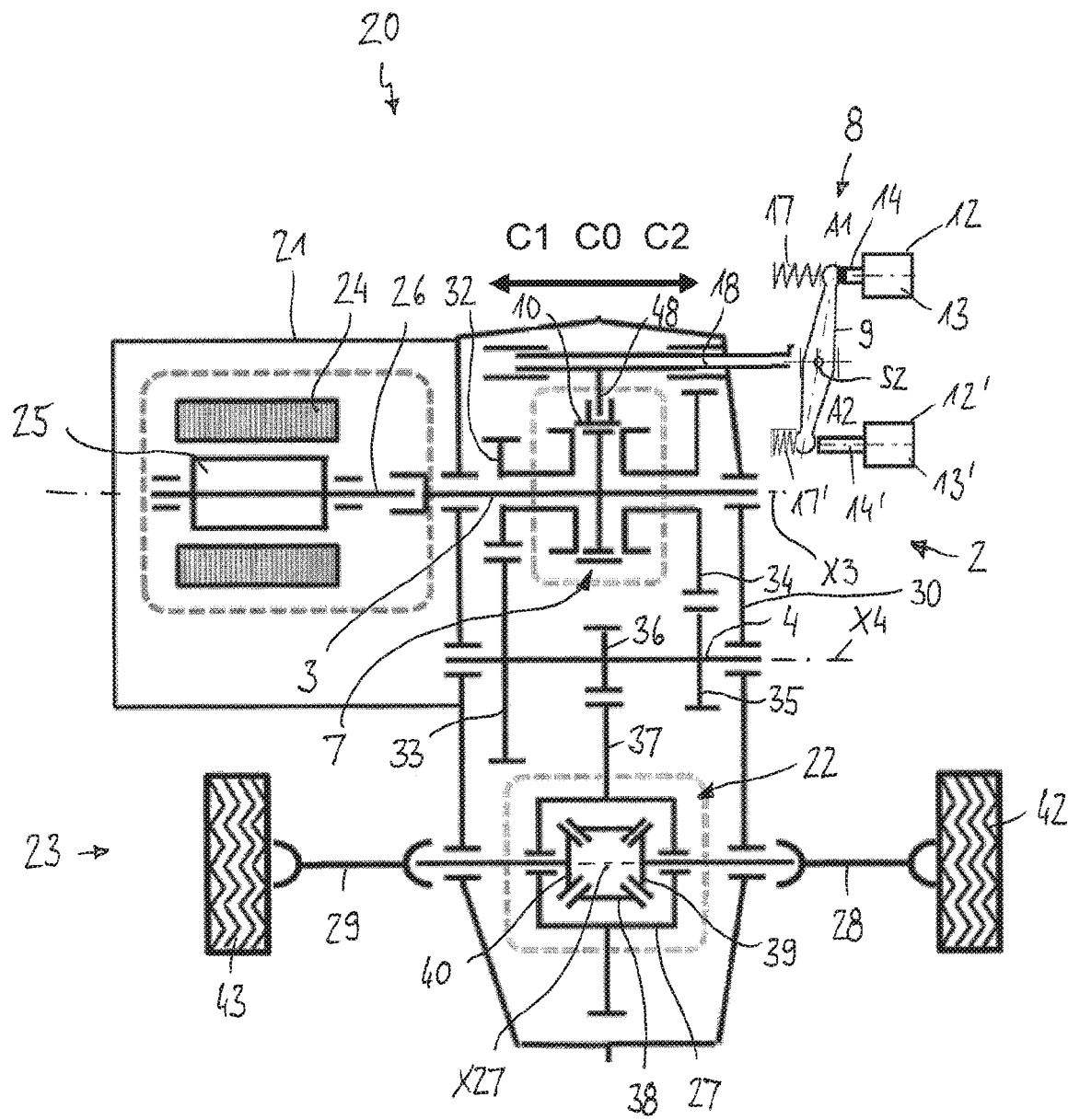
FIG. 4 shows an exemplary electric drive assembly for driving a motor vehicle having a multi-step transmission according to FIG. 1.

FIG. 4 shows an exemplary electric drive 20 having an exemplary multi-step transmission 2 according to FIG. 1. The electric drive 20 comprises an electric machine 21, the multi-step transmission 2 with an actuating assembly 8 and a differential gear 22. The electric drive 20 serves to drive a driving axle 23 of a motor vehicle. The electric drive 20 can be used as the only drive source or it can be used together with an additional drive source.

The electric machine 21 comprises a stator 24 and a rotor 25 which is drivable relative thereto and which, when the electric motor is subjected to current, rotatingly drives a motor shaft 26. The rotational movement of the motor shaft 26 is transmitted to the input shaft 3 by the multi-step transmission 2. The electric machine 21 is supplied by a battery (not shown) with electric current, and it is also possible that the battery can be charged by the electric machine when operated in generator mode.

As described above, the multi-step transmission 2 comprises two transmission stages 5, 6, so that torque introduced by the electric machine 21 from the driveshaft 3 to the output shaft 4 can be transmitted at two different transmission ratios i1, i2. The output shaft 4, which can also be referred to as the intermediate shaft, is drivingly connected to a differential carrier 27 of the differential gearing 22. By means of the differential gearing 22, the introduced torque is transmitted to two sideshafts 28, 29 for driving the vehicle wheels.

The multi-step transmission 2 is configured as a reduction gearing so that a rotational movement introduced by the electric motor 21 is reduced. The first transmission stage 5, which can also be referred to as gear-shift stage or transmission stage, comprises, as torque transmitting members, a first driving gear 32 rotatably supported on the input shaft 3 and a first intermediate gear 33 connected to the intermediate shaft 4 in a rotationally fixed manner, which gears engage one another. The first input gear 32 and the first intermediate gear 33 form a first gear set with a first transmission ratio i1. The second transmission stage comprises as torque transmitting members a second input gear 34 rotatably supported on the input shaft 3 and a second intermediate gear 35 connected to the intermediate shaft 4 in a rotationally fixed way, which gears engaging one another. The second input gear 34 and the second intermediate gear 35 form a second set of gears with a second transmission ration i2. A third transmission stage comprises the output gear 36 connected to the intermediate shaft 4 in a rotationally fixed manner and the annular gear 37 which engages same and is fixed to the differential carrier 11. The output gear 36 of the intermediate shaft 4 and the annular gear 37 thus form a third gear set with a third transmission ratio i3.

By means of suitable bearings the input shaft 3 is supported in the housing 30 of the multi-step transmission so as to be rotatable around a first rotational axis X3. The input gears 32, 34 are rotatably supported via shaft bearings on the input shaft 3. The intermediate shaft 4 is supported by suitable bearings in the housing 30 so as to be rotatable around a second rotational axis X4. The output gear 36 is connected to the intermediate shaft 4 in a rotationally fixed way and arranged axially between the first and the second intermediate gear 33, 35. The intermediate gears 33, 35 are connected, for example, via splines to the intermediate shaft 4. The input shaft 3, the intermediate shaft 4 and the rotational axis X27 of the differential carrier 27 extend parallel to one another.

The output gear 36 of the intermediate shaft 4 engages the annular gear 37 of the differential carrier 27 to introduce torque into the differential 22. The differential carrier 27 which can also be referred to as differential cage is supported by suitable bearings so as to be rotatable around the rotational axis X27. The differential 27 comprises a plurality of differential gears 38 which are rotatably supported in the differential carrier 27 on an axis X38 extending perpendicularly relative to the rotational axis X27, as well as two sideshaft gears 39, 40 which are each rotatably supported coaxially relative to the rotational axis X27 and which engage the differential gears 38. Torque introduced from the annular gear 37 into the differential carrier 27 is transmitted by the differential gears 38 to the two sideshaft gears 39, 40 between which a compensating effect is given. For transmitting torque, the sideshaft gears 39, 40 are connected to the associated sideshafts 28, 29 which transmit the introduced torque to the wheels 42, 43 of the motor vehicle.

The multi-step transmission 2 is shifted by the clutch 7 which is operated by the actuator unit 8. By controlling the actuator unit 8, the multi-step transmission 2 can selectively be changed into the neutral position, the first gear or the second gear. In modification of the multi-step transmission shown in FIG. 1, the actuator unit 8 is oppositely arranged, i.e., the two actuators 12, 12', when subjected to current, act in direction R1 towards the transmission, whereas the springs 17, 17' act on the setting element 9 in a direction R1 away from the transmission. As a result, as regards the operation of the first and the second actuator 12, 12', a reversal of the first and the third transmitting directions S1, S3 is effected. Otherwise the actuator unit 8 is configured as shown in FIGS. 1 and 3, to which reference is here made.

The clutch 7 is arranged axially between the first input gear 32 and the second input gear 34; it can also be referred to as a clutch unit. The clutch 7 comprises an input part 44 which is connected to the input shaft 3 in a rotationally fixed and axially fixed way; a first output part 45 which is fixed to the first input part 32; and a second output part 46 which is fixed to the second gear 34. By means of the movable clutch part 10, the input part 44 can optionally be connected to the first output part 45 or the second output part 46 for transmitting torque. The movable clutch part 10, which can also be referred to as a coupling element, is in particular configured in the form of a sliding muff which is held on the input part 46 in a rotationally fixed and axially movable manner. The sliding muff 45 is operated via the transmitting member 18 by means of the actuating assembly 8. The transmitting member 18 is axially movable and can also be referred to as a moving part. Attached thereto is an operating element 48 which follows the movement of the transmitting element 18 and operates the movable clutch part 10 accordingly. The operating element 48 can be configured in the form of a yoke, for example, which is connected to the movable clutch part in an axially form-locking way, for instance by two crossheads which engage an annular groove of the sliding muff 10.

Per output part 43, 44, the clutch unit 7 can comprise a synchronising mechanism which, prior to connecting, equalises the rotational speed of the components to be connected to one another, i.e., between the input part 42 and the respective output part 43, 44. However, it is also possible that the clutch unit 8 is configured as a form-locking clutch without synchronisation, or as a friction coupling.

By accordingly controlling the clutch unit 7 by the actuator unit 8, torque can be transmitted from the electric motor 32 to the differential 22 and/or to the driving axle 23 selectively via the first power path or alternatively via the second power path. In the neutral position (C0) which is shown in FIGS. 1 and 4 and which can also be referred to as an idling position, the coupling element 10 is in a central position. In this position, the electric motor 21 and the differential 22 are decoupled from one another, so that no torque can be transmitted between the electric motor 21 and the sideshafts 82, 29 (or the other way round). In the first switching position (C1), the coupling element 10 is connected in a rotationally fixed way to the first output part 45 and the first input gear 32, respectively, so that torque is transmitted from the electric motor 21 to the differential 22 via the first power path. In the second transmitting position (C2), the coupling element 10 is coupled to the second output part 46 and the second input gear 34 respectively, so that torque is transmitted via the second power path.

If an undesirable failure function of one of the two actuators 12, 12' takes place, the setting element 9 in the present embodiment is moved by the springs 17, 17' into the second switching position S2, so that the clutch is opened accordingly, i.e., it is transferred into the neutral position C0.

Figures 5, 6:
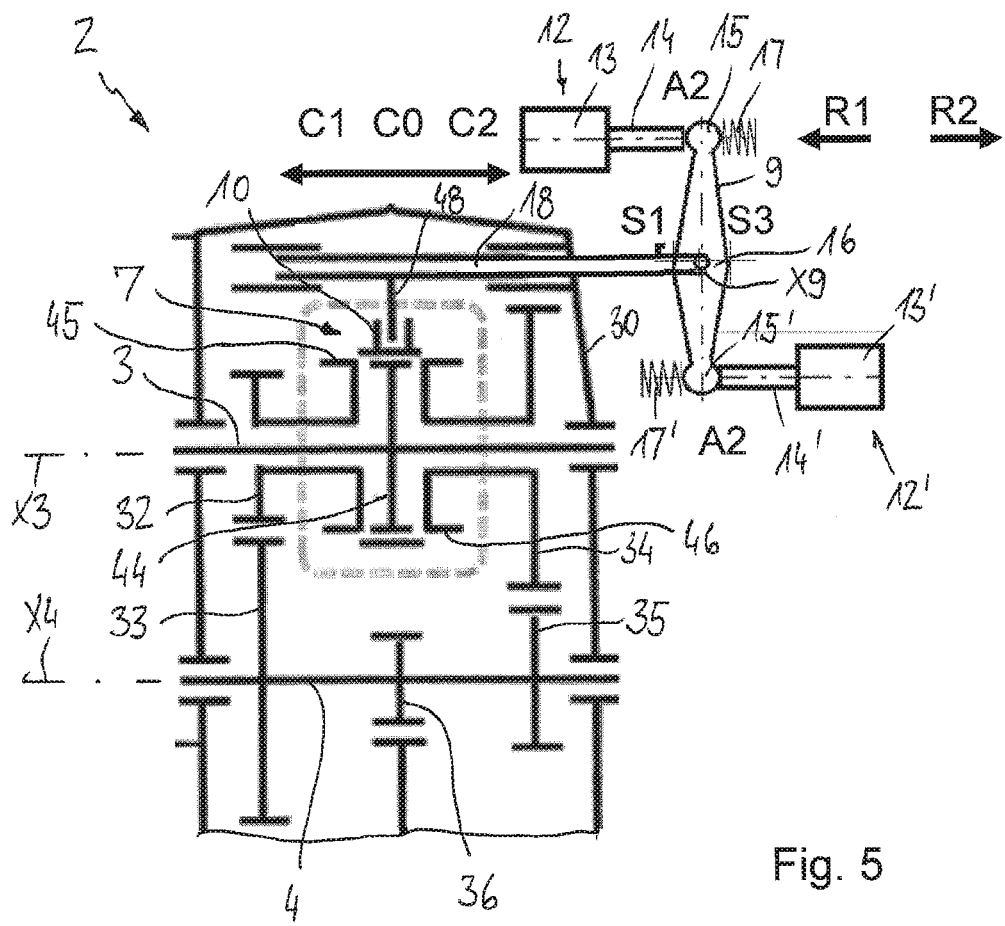
FIG. 5 shows an exemplary multi-step transmission in a second embodiment.
FIG. 6 shows a possible transmission diagram according to FIG. 5.

FIGS. 5 to 7, which will be described jointly below, show an exemplary multi-step transmission 2 in a further embodiment. This largely corresponds to the multi-step transmission shown in FIGS. 1 to 3, so that as far as common features are concerned, reference is made to the above description. Here, identical details or details corresponding to one another have been given the same reference numbers as in FIGS. 1 to 3.

Figure 7A:
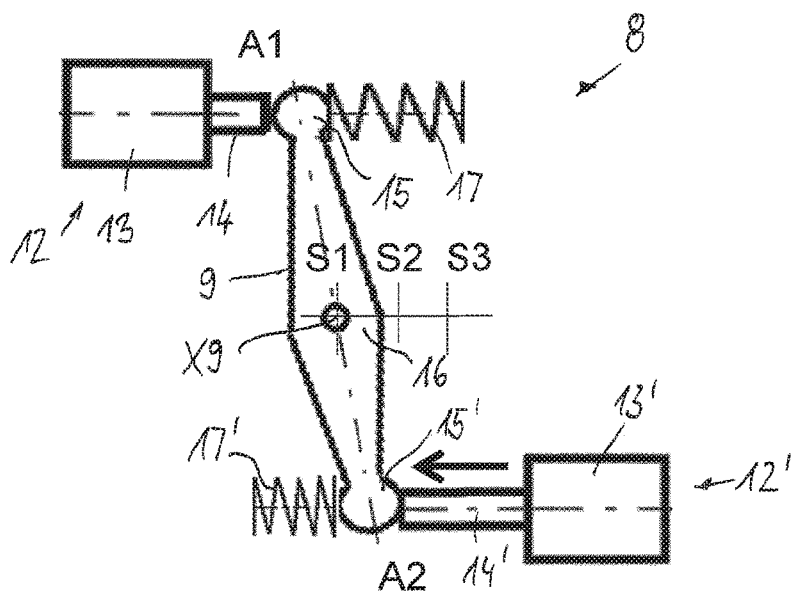
FIG. 7A shows the actuator assembly of the multi-step transmission according to FIG. 5 in a first transmission position.

The only difference lies in the configuration of the actuating assembly 2. The two actuators 12, 12' in the embodiment according to FIGS. 5 to 7 are arranged such that, when the respective electromagnets 13, 13' are subjected to current, the two pistons 14, 14' are loaded in opposite directions R1, R2. By this arrangement the following shiftings of the setting element 9 can be effected:

The first setting position S1 of the setting element 9 can be achieved in that the first actuator 12 is transferred into the first actuating position A1 and the second actuator 12' is transferred into the second actuating position A2. This switching position is shown in FIG. 7A. The setting portion 16 of the setting element 9 is in an end position (left position in FIG. 7A), so that, accordingly, the transmission member 18 connected thereto assumes a corresponding end position. The movable clutch element 10 is displaced into the first clutch position C1, so that torque is transmitted via the first transmission stage 5 from the input shaft 3 to the output shaft 4.

Figure 7B:
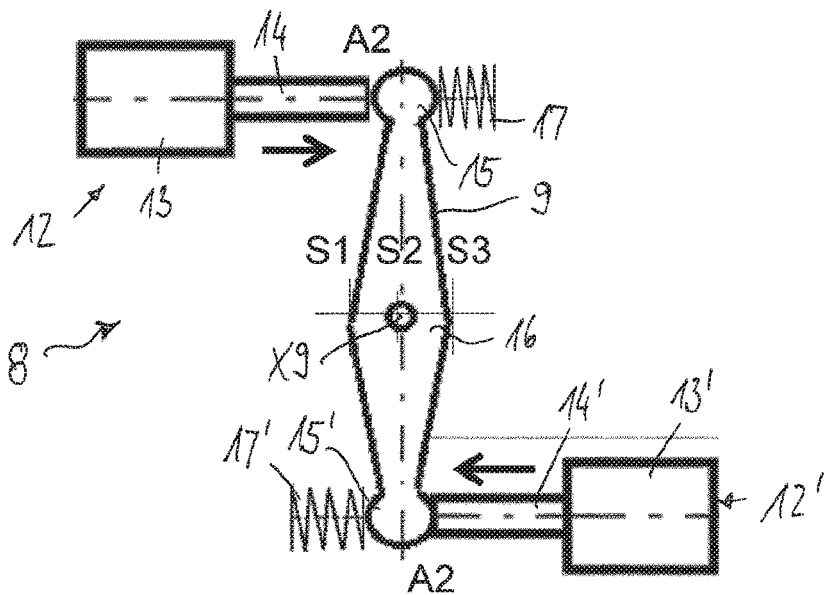
FIG. 7B shows the actuator assembly of the multi-step transmission according to FIG. 5 in a second transmission position.

By operating the actuators 12, 12' such that the two pistons 14, 14' assume the second actuating position A2, the setting element 9 is moved into a second setting position S2 which is shown in FIGS. 5 and 7B. The transmitting element 18 connected to the setting element 9, together with the setting portion 16, is moved out of the end position into a central position. Accordingly, the clutch element 10 connected to the transmitting element 18 is transferred into the neutral clutch position C0, so that the input shaft 3 and the output shaft 4 are decoupled from each other and can rotate freely relative to each other. The second setting position S2 of the setting element 9 can also be set in that both actuators 12, 12' are transferred into the first actuating position A1, which is shown only diagrammatically in the circuit diagram, i.e., in the second column (A1, A1, S2, C0).

Figure 7C:
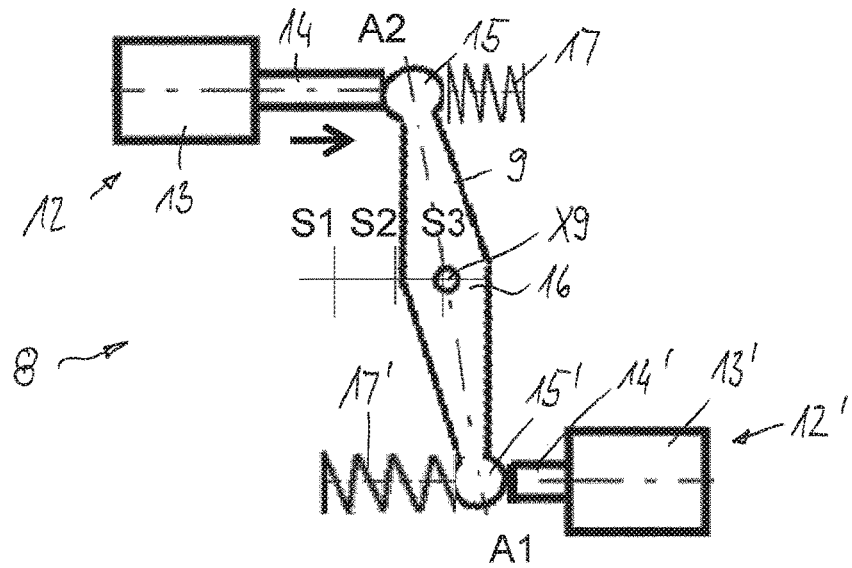
FIG. 7C shows the actuator assembly of the multi-step transmission according to FIG. 5 in a third transmission position.

The third setting position S3 of the setting element 9 can be set in that the first actuator 12 is transferred into the second actuating position A2 and the second actuator 12' into the first actuating position A1. This transmission condition is shown in FIG. 7C. The setting portion 16 of the setting element 9 is in a second end position (righthand position in FIG. 7C), so that the transmitting member 18 connected thereto assumes a corresponding end position. The movable clutch member 10 is displaced into the second clutch position C2, so that torque is transferred via the second transmission stage 6 from the input shaft 3 to the output shaft 4.

In the present embodiment according to FIGS. 5 to 7, the first actuator position A1 is effected by the spring 17, 17' acting on the respective end portion 15, 15' after the associated electromagnet 13, 13' has been disconnected from current. Accordingly, if both actuators 12, 12' are disconnected from current, for example as a result of an unwanted failure function, the multi-step transmission 2 is transferred into the neutral position, so that both shafts 3, 4 can freely rotate relative to one another.

The first actuator 12, when being subjected to current, generates a force in the first direction R1 away from the transmission, whereas the second actuator 12', when being subjected to current, generates an operating force in the second direction R2 towards the transmission. It is understood that, according to an alternative variant, a reversed arrangement is also possible in that the first actuator 12 acts in the second direction R2 and the second actuator 12' acts in the first direction R1. In this case, the transmission conditions for setting the first and the second clutch position (C1, C2) are reversed.

Figures 8, 9:
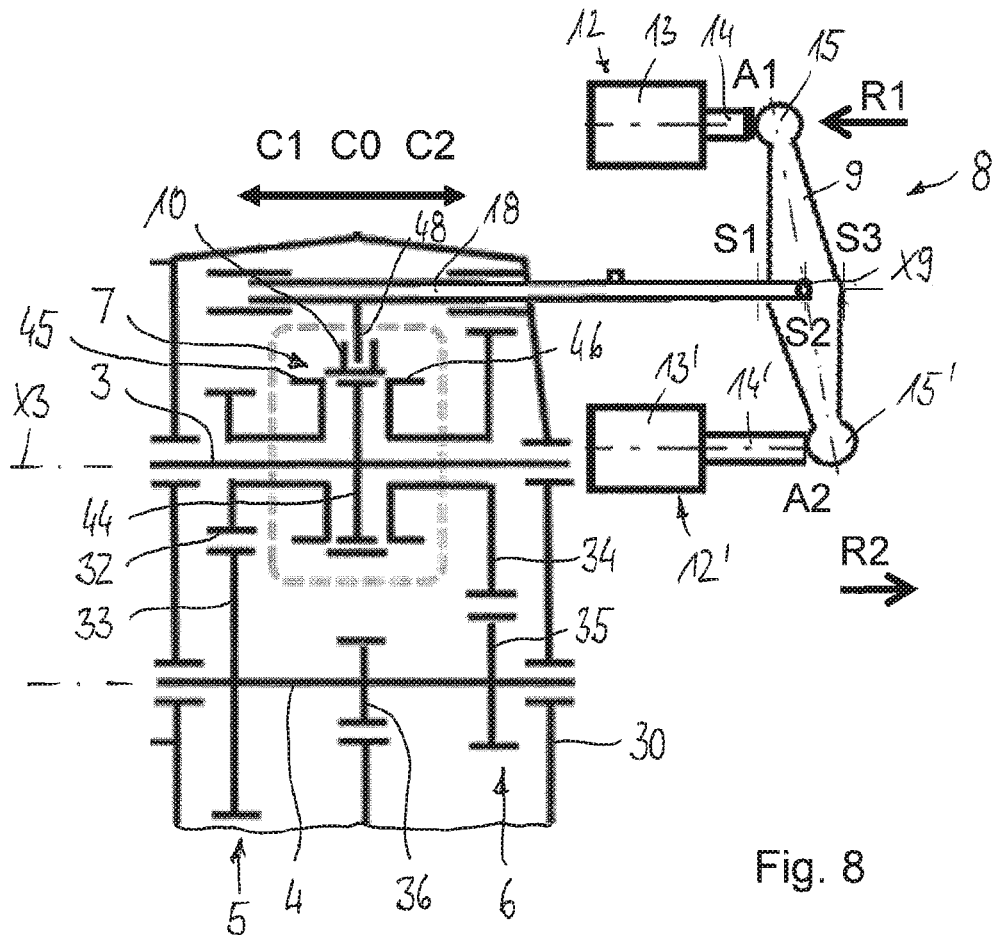
FIG. 8 shows an exemplary multi-step transmission in a third embodiment.
FIG. 9 shows a possible transmission diagram of the multi-step transmission according to FIG. 8.
Figure 10A:
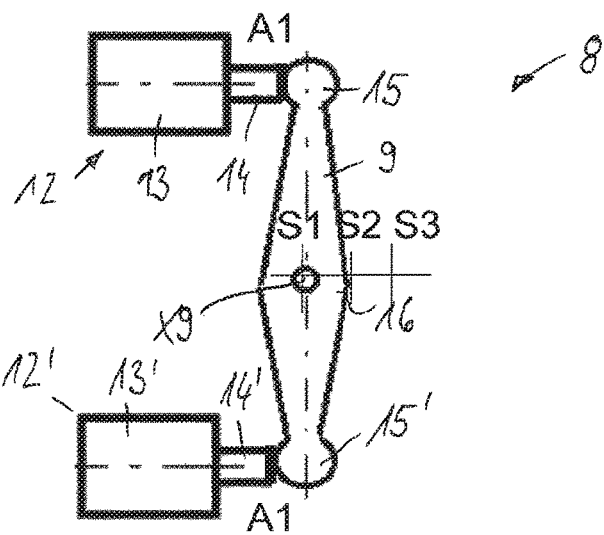
FIG. 10A shows the actuator assembly of the multi-step transmission of FIG. 8 in in a first transmission position.
Figure 10B:
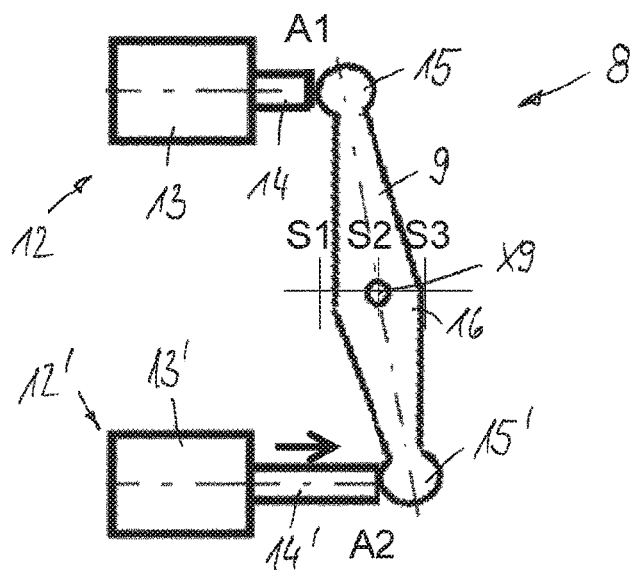
FIG. 10B shows the actuator assembly of the multi-step transmission of FIG. 8 in in a second transmission position.
Figure 10C:
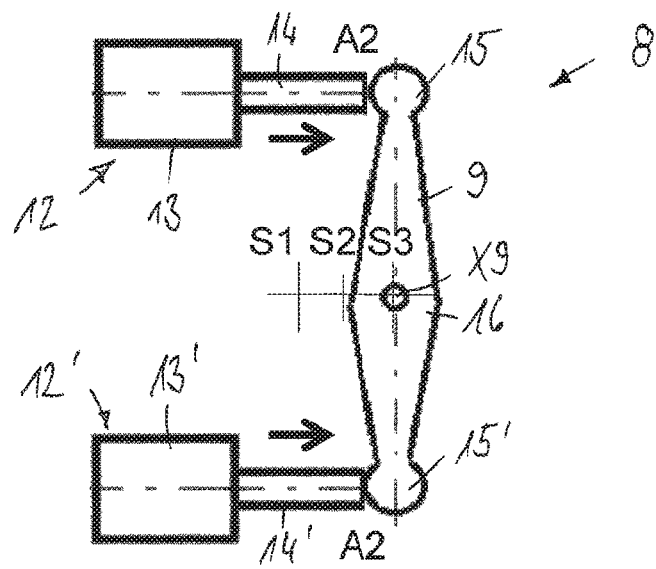
FIG. 10C shows the actuator assembly of the multi-step transmission of FIG. 8 in in a third transmission position.

FIGS. 8 to 10 which will be described jointly below show an exemplary multi-step transmission 2 in a further embodiment. This largely corresponds to the multi-step transmission shown in FIGS. 1 to 3, so that in respect of common features, reference is made to the above description. Identical details or details corresponding to one another have been given the same reference numbers as in FIGS. 1 to 3.

The only difference lies in the configuration of the actuating assembly 2. Here, the two actuators 12, 12' are configured as bi-stable actuators. The bi-stable actuators 12, 12' are configured such that the pistons 14, 14'—when the associated electromagnets 13, 13' are subjected to current with a first polarity (+/−)—are transferred into a first actuating position A1 and—when the electromagnets 13, 13' are subjected to current with a second polarity (−/+)—the pistons are transferred into a second actuating position A2. When the electromagnet 13, 13' is current-free, the piston 14, 14' remains in the existing actuating position. With bi-stable actuators a returning spring is not required.

Otherwise the embodiment shown in FIGS. 8 to 10, in particular in respect of movement kinematics and setting the transmission stages, corresponds to FIGS. 1 to 4, so that reference is made abbreviatory to the above description. It is to be understood that the present actuator assembly 8 with bi-stable actuators 12, 12' can also be used for the electric drive shown in FIG. 4.

Figure 11:
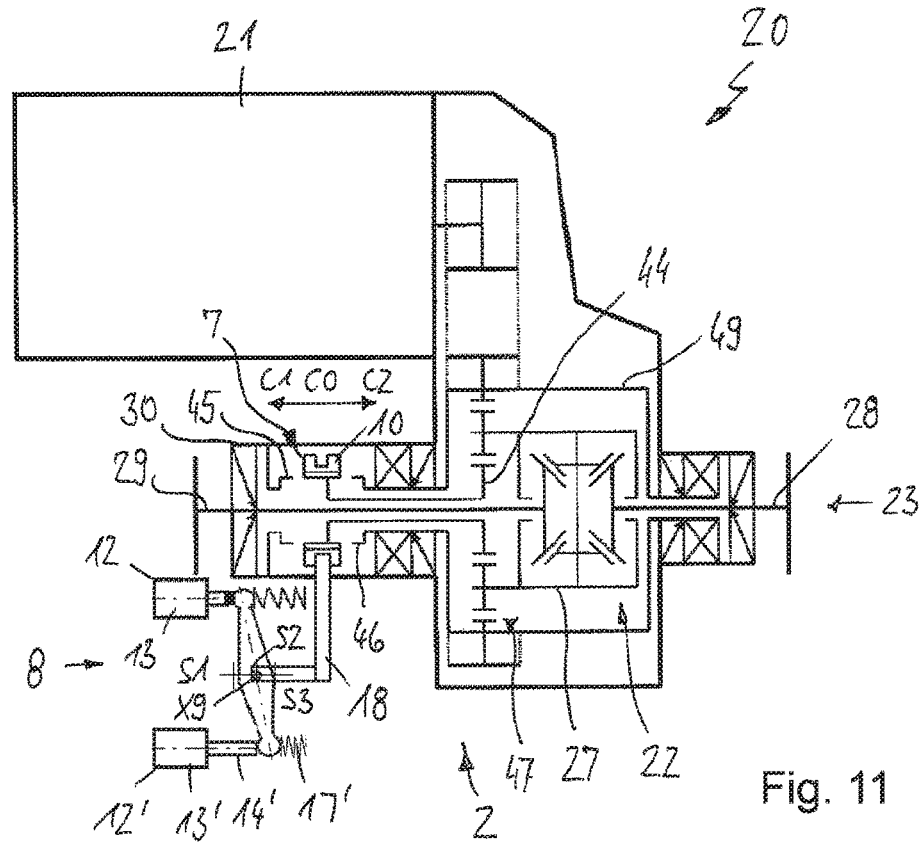
FIG. 11 shows an electric drive assembly having an exemplary multi-step transmission in a further embodiment.

FIG. 11 shows an electric drive in a further embodiment which is similar to the embodiment shown in FIG. 4. Details corresponding to one another or similar details therefore have been given the same reference numbers as in FIG. 4.

The electric drive 2 comprises an electric motor 21, a transmission unit with a multi-step transmission 2 and a differential gearing 22 which transmits a driving moment from the electric motor 21 to two sideshafts 28, 29. The multi-step transmission 2 comprises two transmission stages 5, 6, a clutch 7 and an actuator assembly 8. By this configuration the input axle 23 can be driven at different speeds, depending on the switching position of the actuators 12, 12' and the clutch 7, respectively.

The actuator assembly 8 is configured as shown in FIGS. 1 to 4, so that reference is made to the above description abbreviatory. The electric drive (excluding the actuator assembly) is described in detail in WO 2012/007031 A1 the full contents of which are included here.

The clutch unit 7 can be transferred by the actuator assembly 8 into three switching positions. In a first switching position S1 of the setting element 9, the movable clutch part 10 is in a first clutch position C1. In this clutch position C1 the sun gear 44 is connected to the fixed housing 30 in a rotationally fixed manner. A torque introduced by the electric drive is supported on the housing 30, so that the planetary carrier and the differential carrier 27 are driven at a first speed. In the second transmission position S2 of the setting element 9, the clutch 7 idles, i.e., in clutch position C0. The sun gear 44 is freely rotatable, both relative to the rotatingly drivable housing 49 and also relative to the stationary housing 30. In this switching position no transmission of torque takes place between the electric motor 21 and the sideshafts 28, 29. By controlling the actuator assembly 9 into the third switching position S3, the clutch 7 assumes the second clutch position C2, so that the sun gear 44 is connected to the rotatingly drivable housing 49 in a rotationally fixed way. In this second clutch position C2, the rotatingly drivable housing 49, the hollow gear, the sun gear 44, the planetary carrier, and the differential carrier 27 connected thereto, jointly rotate around the rotational axis X27. In consequence, there is no translation to reduced speed by the planetary gear 47, so that a different transmission ratio relative to the first clutch position is obtained.

Figure 12:
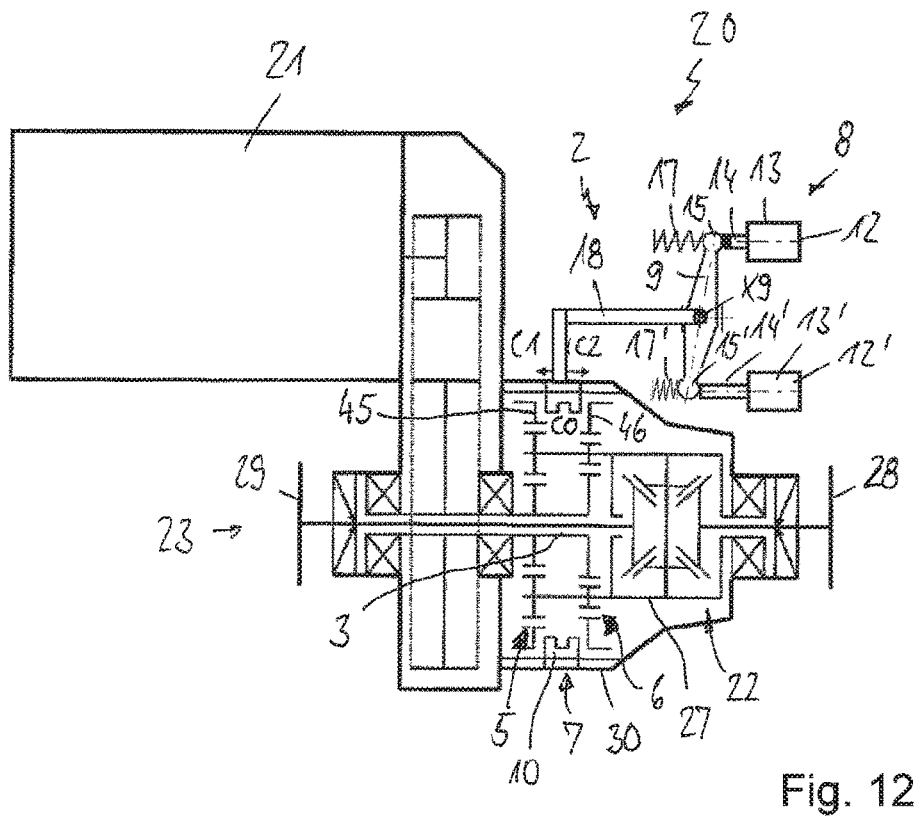
FIG. 12 shows an electric drive assembly having an exemplary multi-step transmission in a further embodiment.

FIG. 12 shows an electric drive in a further embodiment which is similar to that shown in FIG. 4. Details corresponding to one another or details which are similar have been given the same reference number as in FIG. 4.

The electric drive 2 comprises an electric motor 21, a transmission unit having a multi-step transmission 2 and a differential gearing 22 which transmits a driving moment from the electric motor 21 to two sideshafts 28, 29. The multi-step transmission 2 comprises two transmission stages 5, 6, a clutch 7 and an actuator assembly 8. Depending in the switching position of the actuators 12, 12' and the clutch 7, respectively, this configuration allows the input axle 23 to be driven at different speeds.

The actuator assembly 8 is configured as shown in FIGS. 1 to 4, so that, in that respect, reference is made to the above description. The electric drive (excluding the actuator assembly) is described in detail in WO 2012/007030 A1 the contents of which are incorporated herein by reference in their entirety.

In a first switching position S1 of the actuator unit 8, corresponding to the first clutch position C1 of the clutch 7, the first hollow gear 45 is connected to the stationary housing 30 in a rotationally fixed way, whereas the second hollow gear 46 can freely rotate relative to the stationary housing. In this transmission position, the transmission of torque takes place from the hollow shaft 3 via the first planetary stage 5 to the differential carrier 27. In a second switching position S2 of the actuator unit, corresponding to a neutral clutch position C0 of the clutch 7, both hollow gears 45, 46 are freely rotatable relative to the housing 30. In this switching position, no torque transmission between the hollow shaft 3 and the differential carrier 27 takes place, i.e., between the electric motor 21 and the sideshafts 28, 29. In a third transmission position S3 of the actuator unit 8, corresponding to a second clutch position C2, the first hollow gear 45 is freely rotatable relative to the stationary housing 30, whereas the second hollow gear 46 is connected to the stationary housing in a rotationally fixed manner. In this switching position, the transmission of torque takes place from the hollow shaft 3 via the second planetary gear stage 6 to the differential carrier 27.

The two last-mentioned applications according to FIGS. 12 and 13 are given by way of example. It is to be understood that the actuator assembly 8 can be used in any other multi-step transmissions 2 comprising three transmission stages.

LIST OF REFERENCE NUMBERS 2 multi-step transmission
3 input shaft
4 output shaft
5 transmission stage
6 transmission stage
7 clutch
8 actuating assembly
9 setting element
10 clutch part
11
12, 12' actuator
13, 13' electromagnet
14, 14' piston
15, 15' portion
16 setting portion
17, 17' spring
19
20 drive assembly
21 electric machine
22 differential gearing
23 drive axle
24 stator
25 rotor
26 motor shaft
27 differential carrier
28 sideshaft
29 sideshaft
30 housing
31
32 first input gear
33 first intermediate gear
34 second input gear
35 second intermediate gear
36 output gear
37 annular gear
38 differential gears
39 sideshaft gear
40 sideshaft gear
42 wheel
43 wheel
44 input part
45 first output part
46 second output part
47 planetary gearing
48 operating element
49 rotatingly drivable housing
A1, A2 actuator position
C0, C1, C2 clutch position
R1, R2 direction
S1, S2, S3 setting position
X axis

The invention claimed is:

1. A multi-step transmission, comprising:
   an input shaft;
   an output shaft;
   a first transmission stage;
   a second transmission stage;
   a clutch which can be transferred into three clutch positions and which is configured to selectively drivingly connect the input shaft and the output shaft to each other via the first transmission stage or the second transmission stage, or to disconnect the input shaft and the output shaft from each other; and
   an actuating assembly for operating the clutch, wherein the actuating assembly comprises a movable setting element which is movable into three setting positions and which is connected to a movable clutch part of the clutch,
   wherein the actuating assembly comprises a first electromagnetically operable actuator and a second electromagnetically operable actuator that are operable independently of each other into individual positions and that jointly act on the control element such that depending on the individual position of the first and second actuator the setting element is transferrable by the first and second actuator into the three setting positions.

2. The multi-step transmission of claim 1,
wherein the setting element comprises a first portion which is connected to the first electromagnetically operable actuator and a second portion which is connected to the second electromagnetically operable actuator,
wherein the first portion and the second portion are arranged at a distance from one another, and
wherein a first line of force of the first actuator extends through the first portion and a second line of force of the second actuator extends through the second portion.

3. The multi-step transmission of claim 2,
wherein the first line of force and the second line of force extend parallel to one another.

4. The multi-step transmission of claim 1,
wherein the setting element is provided in the form of a pivotable rocker which is pivotable around a pivot axis, wherein the pivot axis is arranged between the first portion and the second portion, wherein the movable clutch part is connected to the setting element in a region of the pivot axis.

5. The multi-step transmission of claim 1,
wherein the first and the second actuator each comprise an electromagnet and a piston, wherein the piston is displaceable when the electromagnet is actuated.

6. The multi-step transmission of claim 5,
wherein at least one of the first and the second actuator is configured in the form of a mono-stable actuator such that, when the electromagnet is supplied with current, the piston is force-loaded in a first direction, and when the electromagnet is in a current-less condition, the piston is force-free wherein a returning spring is provided which loads the piston in an opposite second direction.

7. The multi-step transmission of claim 5,
wherein the first and the second actuator are arranged such that the pistons are loaded in the same direction when the respective associated electromagnet is supplied with current.

8. The multi-step transmission of claim 5,
wherein the first and the second actuator are arranged such that the pistons, when the respective associated electromagnets are supplied with current, are loaded in opposite directions.

9. The multi-step transmission of claim 5,
wherein at least one of the first and of the second actuator is designed in the form of a bi-stable actuator such that the piston is transferred into a first actuating position when the electromagnet is supplied with current with a first polarity, and into a second actuating position when the electromagnet is supplied with current with a second polarity.

10. The multi-step transmission of claim 1,
wherein the first and the second actuator are each transferrable into a first actuating position and into a second actuating position,
wherein a first setting position of the setting element is defined in that the first actuator and the second actuator are each in the first actuating position,
wherein the second setting position of the setting element is defined in that one of the first and of the second actuator is in the first actuating position and the other one of the first and the second actuator is in the second actuating position, and
wherein a third setting position of the setting element is defined in that the first actuator and the second actuator are each in the second actuating position.

11. The multi-step transmission of claim 1,
wherein the first and the second actuator are each transferrable into a first actuating position and into a second actuating position,
wherein a first setting position of the setting element is defined in that one of the first and of the second actuator is in the first actuating position and the other one of the first and of the second actuator is in the second actuating position,
wherein a second setting position of the setting element is defined in that the first actuator and the second actuator are both in the first actuating position or in the second actuating position,
wherein a third setting position of the setting element is defined in that one of the first and of the second actuator is in the second actuating position and the other one of the first and of the second actuator is in the first actuating position.

12. The multi-step transmission of claim 1,
wherein the clutch is optionally transferrable by the actuation assembly into a first clutch position in which torque is transmitted via the first transmission stage from the input shaft to the output shaft, or into a neutral position in which the driveshaft and the output shaft are freely rotatable relative to one another, as well as into a second clutch position in which torque is transmitted via the second transmission stage from the driveshaft to the output shaft.

13. An electric drive assembly for a motor vehicle, comprising:
an electric machine for driving the motor vehicle,
a multi-step transmission drivable by the electric machine,
a differential drive drivable by the multi-step transmission,
wherein the multi-step transmission comprises an input shaft, an output shaft, a first transmission stage, a second transmission stage, a clutch which can be transferred into three clutch positions and which is configured to selectively drivingly connect the input shaft and the output shaft to each other via the first transmission stage or the second transmission stage or to disconnect the input shaft and the output shaft from each other, an actuating assembly for operating the clutch, wherein the actuating assembly comprises a movable setting element which is movable into three setting positions and which is connected to a movable clutch part of the clutch, wherein the actuating assembly comprises a first electromagnetically operable actuator and a second electromagnetically operable actuator that are operable independently of each other into individual positions and that jointly act on the control element such that depending on the individual position of the first and second actuator the setting element is transferrable by the first and second actuator into the three setting positions,
wherein the input shaft of the multi-step transmission is drivingly connected to the electric machine, and the output shaft of the multi-step transmission is drivingly connected to the differential drive.

14. A method of controlling the multi-step transmission that comprises an input shaft, an output shaft, a first transmission stage, a second transmission stage, a clutch which can be transferred into three clutch positions and which is configured to selectively drivingly connect the input shaft and the output shaft to each other via the first transmission stage or the second transmission stage or to disconnect the input shaft and the output shaft from each other, an actuating assembly for operating the clutch, wherein the actuating assembly comprises a movable setting element which is movable into three setting positions and which is connected to a movable clutch part of the clutch, wherein the actuating assembly comprises a first electromagnetically operable actuator and a second electromagnetically operable actuator that are operable independently of each other into individual positions and that jointly act on the control element such that depending on the individual position of the first and second actuator the setting element is transferable by the first and second actuator into the three setting positions, the method comprising:

setting the first actuator exactly to a first actuating position or to a second actuating position, and setting the second actuator exactly to a first actuating position or to a second actuating position.

15. The method according to claim 14, wherein the setting element is transferred into a first setting position by setting the first actuator and the second actuator respectively to the first actuating position;

wherein the setting element is transferred into a second setting position by setting one of the first and of the second actuator to the first actuating position and the other one of the first and of the second actuator to the second actuating position; and wherein the setting element is transferred into a third setting position by setting the first actuator and the second actuator respectively to the second actuating position.

16. The method according to claim 14, wherein the setting element is transferred into a first setting position by setting one of the first and of the second actuator to the first actuating position and the other one of the first and second actuator to the second actuating position;

wherein the setting element is transferred into a second setting position by setting both the first actuator and the second actuator to the first actuating position or to the second actuating position;

wherein the setting element is transferred in a third setting position by setting one of the first and the second actuator to the second actuating position, and the other one of the first and the second actuator to the first actuating position.

* * * * *